(12) United States Patent
Bielski (10) Patent No.: US 9,378,119 B2
(45) Date of Patent: Jun. 28, 2016

(54) RELEASE TEMPLATE

(71) Applicant: Verizon Patent and Licensing Inc., Arlington, VA (US)

(72) Inventor: Joseph M. Bielski, Hackettstown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/488,899

(22) Filed: Sep. 17, 2014

(65) Prior Publication Data

US 2016/0077953 A1    Mar. 17, 2016

(51) Int. Cl.
*G06F 9/44* (2006.01)
*G06F 11/36* (2006.01)

(52) U.S. Cl.
CPC ............. *G06F 11/3664* (2013.01); *G06F 8/70* (2013.01)

(58) Field of Classification Search
CPC ................................ G06F 11/3664; G06F 8/70
See application file for complete search history.

(56) References Cited

U.S. PATENT DOCUMENTS

| 6,385,768 B1 * | 5/2002 | Ziebell | G06F 8/71 707/999.202 |
| 6,789,252 B1 * | 9/2004 | Burke | G06F 8/10 717/100 |
| 9,207,931 B2 * | 12/2015 | Fox | G06F 8/65 |
| 2002/0133395 A1 * | 9/2002 | Hughes | G06Q 10/083 705/300 |
| 2005/0166094 A1 * | 7/2005 | Blackwell | G06F 11/3664 714/38.14 |
| 2006/0200803 A1 * | 9/2006 | Neumann | G06F 8/71 717/120 |
| 2008/0120129 A1 * | 5/2008 | Seubert | G06Q 10/06 705/35 |
| 2009/0172035 A1 * | 7/2009 | Lessing | G06Q 30/02 |
| 2010/0083211 A1 * | 4/2010 | Poole | G06F 8/75 717/101 |
| 2013/0179482 A1 * | 7/2013 | Becker | G06F 17/30091 707/830 |
| 2013/0227517 A1 * | 8/2013 | Fox | G06F 9/44 717/101 |
| 2013/0254741 A1 * | 9/2013 | Spassov | G06F 8/71 717/110 |
| 2013/0297579 A1 * | 11/2013 | Andrew | G06F 8/71 707/698 |
| 2014/0201094 A1 * | 7/2014 | Herrington | G06K 9/00577 705/317 |
| 2014/0282353 A1 * | 9/2014 | Jubran | G06F 8/00 717/101 |
| 2014/0358735 A1 * | 12/2014 | Robinson | G06Q 30/0641 705/27.1 |
| 2014/0365782 A1 * | 12/2014 | Beatson | G06F 21/32 713/186 |
| 2015/0161565 A1 * | 6/2015 | Kraft | G06Q 10/00 348/441 |

* cited by examiner

*Primary Examiner* — Chameli Das (57) ABSTRACT

A project change control record in a release template controls the release of a code change from a change control platform into a test environment. The change control platform receives the code change from a developer. The change control platform applies the code change to the test environment only if the corresponding project change control record exists in the release template and a project corresponding to the code change has an approved status in a project management platform.

20 Claims, 7 Drawing Sheets

RELEASE TEMPLATE

BACKGROUND

Testing software applications in a test environment before deploying the software applications into production is commonplace. However, some changes (e.g., code changes) to one or more of those software applications in the test environment may need to be coordinated with other changes so that the one or more software applications continue to function properly in the test environment.

A common approach is for a developer to submit code changes to a change control platform. After submission, the developer notifies an application development manager that the code change has been submitted and the application development manager sets a status for a project corresponding to the code change to approved in a project management platform. In one example, an application test team member, after reviewing the code change submission in the change control platform, manually approves the code change to be applied in the test environment. The application test team member, however, does not review the project status in the project management platform. In addition, neither the application test team member nor the application development manager review any other code changes or any other projects to determine whether it would be appropriate to apply the code change. Thus, the code change may be applied in the test environment even if the code change should be coordinated with other code changes, particularly those other code changes that are not yet completed. As such, after the code change is applied, the one or more applications in the test environment may stop functioning properly because the other code changes were not also applied.

Hence a need exists for coordinating code changes to be applied in a test environment via a release template.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Software applications, particularly those applications supporting enterprise organizations, are often complex collections of multiple inter-related modules or components. Each module or component is a set of programming code or instructions that cause a processor to perform one or more functions. Thus, a software application is a collection of multiple sets of programming code or instructions that, when executed, performs various functions. For example, an accounting application includes various modules or components such as: accounts receivable for tracking outstanding bills/invoices to and payments from others (e.g., clients, customers, etc.), accounts payable for tracking outstanding bills/invoices from and payments to others (e.g., vendors, suppliers, etc.), general ledger for tracking all transactions, chart of accounts, and billing/invoicing for generating bills/invoices. Although each individual module performs specific functions, some of that functionality may depend on functions performed by one or more of the other modules. In the accounting application, for example, some accounts receivable functionality depends on functionality within billing/invoicing (e.g., billing/invoicing has to first generate a bill to be tracked in accounts receivable). As such, any change in one module may impact the functionality of various other modules and the application as a whole. In addition, a change in one module, without coordinated change(s) elsewhere, may negatively impact or even "break" the application. Therefore, applying changes in such a complex software application environment needs to be coordinated to ensure changes are applied only at or after an appropriate date and/or time.

To further complicate this already often complex software application environment, different individuals, groups, and/or organizations may be responsible for, and implement changes to, different modules or components within the software application. For example, a first developer or group of developers is responsible for module A while a second developer or group of developers is responsible for module B. An additional complication exists when, for example, changes to module A are tracked within a first project while changes to module B are tracked within a second project.

In still a further complication, a separate individual or group is responsible, in one example, for applying any changes manually to the software application so that the application can be tested with the changes. In this example, the so-called test team looks for any changes submitted by developers and applies those changes, regardless of whether one change should be conditioned on and/or coordinated with another change. As such, an increased risk exists that a change will be applied to the software application and cause the software application to stop functioning properly until any other changes that should have been applied at the same time are applied.

To minimize any impact on software applications already running in production, a copy of one or more of the software applications is run in a test environment (e.g., isolated hardware and software with limited and/or controlled access). Code changes, in one example, are applied to the one or more software applications in the test environment so that the modified application(s) can be tested. However, even in the test environment, code changes may need to be coordinated to ensure ongoing testing is not negatively impacted. Stated another way, even if one developer completes a code change and would like to test the code change, application of the completed code change to the test environment may need to be delayed until other code changes are also completed. Then, once all of the anticipated and inter-related code changes are completed, all of the code changes can be applied to the test environment in a coordinated manner such that the test environment continues to function.

In the following examples, several individuals performing similar roles are described. In general, the role of a project manager is to identify steps and/or milestones within a project, identify individual(s) responsible for performing each step, tracking the activity of those responsible individuals and ensuring steps are completed/milestones are achieved. As it relates to software application development and testing, there may be various projects, including multiple projects each directed to individual aspects of the software development (e.g., an individual code change or software application modification) as well as an overall project coordinating the individual code change projects, overall software application(s) testing and release of the tested software application(s) into production. A release coordinator is one example of an individual who takes the project management role with responsibility for the overall project. In comparison, an application development manager is one example of an individual who takes the project management role, but only with responsibility for one or more of the individual code change projects. In addition, a developer is one example of an individual who performs one or more code changes for one or more of the individual code change projects. At the same time, a test team is one example of a team of individuals responsible for applying code changes to software applications in the test environment.

In one example, coordination between code changes to a software application in a test environment is performed via a release template. A release coordinator, in the example, collects information related to the software application as a whole. The information includes, for example, any code changes to be made to the software application as well as a date and/or time on or after which each change is to be applied. The release template, in this example, is populated based on the collected information. For example, a project change control record containing a project identifier corresponding to each code change to be made is created in the release template. In one example, each project change control record is created directly by the release coordinator after the information is collected.

When a developer submits a code change to a change control platform in this example, the developer also notifies an application development manager of such code change submission. The application development manager, for example, sets a status of a code change project corresponding to the code change in a project management platform to approved as a result of the submission notification. A test team member, in this example, can initiate an automated process that applies code changes submitted to the change control platform only if a set of conditions are met. In one example, the set of conditions include: the condition that the project corresponding to the code change to be applied is approved in the project management platform; and the condition that at least one project change control record containing the project identifier corresponding to the code change exists in the release template.

In a further example, each project change control record contains a date field and the set of conditions further includes a condition that, when the date field of the at least one project change control record in the release template data structure containing the project identifier value corresponding to the code change contains a date, a current date is the same or later than the date contained in the date field. In still a further example, each project change control record contains a timestamp field and the set of conditions further includes a condition that, when the timestamp field of the at least one project change control record in the release template data structure containing the project identifier value corresponding to the code change contains a timestamp, a current time is the same or later than the timestamp contained in the timestamp field. In this way, code changes in the change control platform will only be applied to the software application on or after an appropriate date and/or time and in appropriate coordination with other code changes based on the release template.

Figure 1:
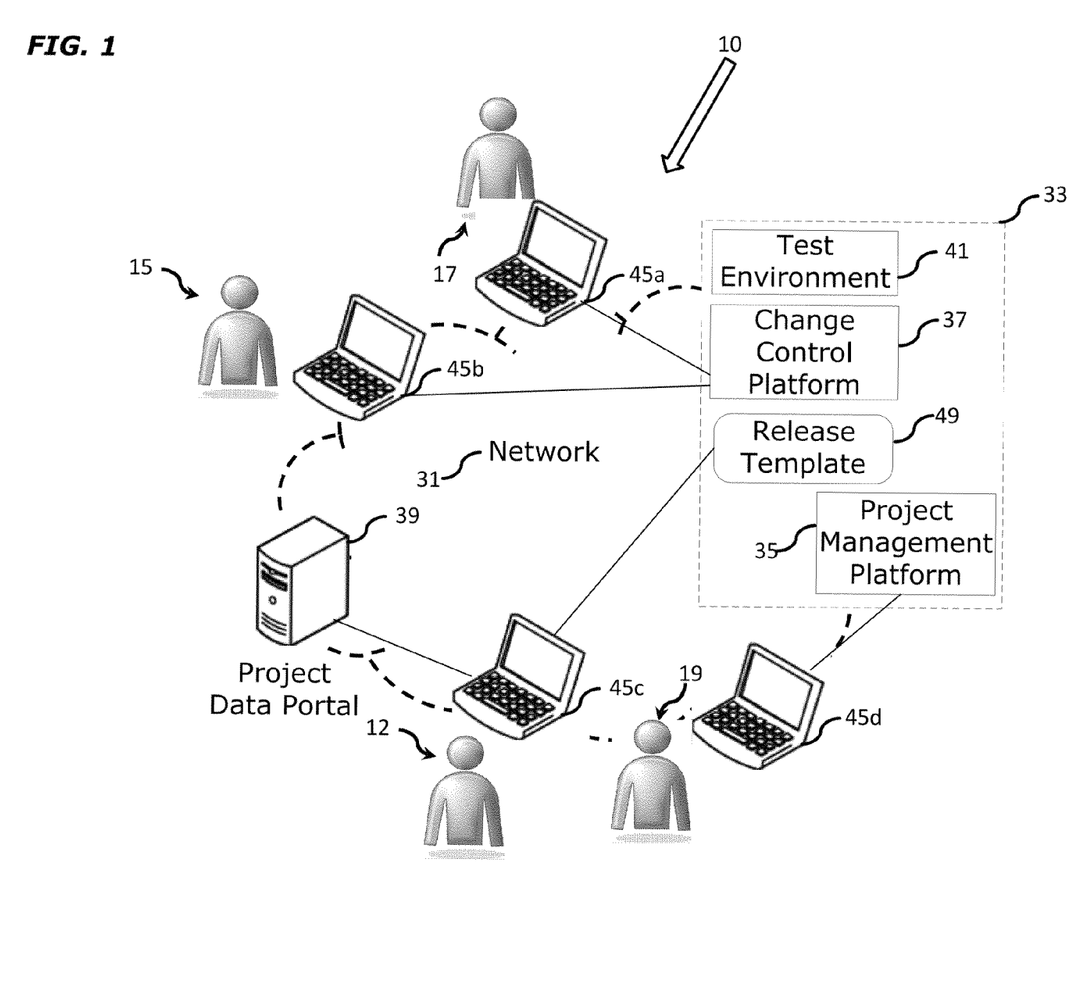
FIG. 1 is a functional block diagram of an example of a system for coordinating the release of code changes into a test environment via a release template.

Reference now is made in detail to the examples illustrated in the accompanying drawings and discussed below. FIG. 1 illustrates a system 10 of an enterprise or other organization that may want to coordinate code changes via a release template as discussed herein. The system 10 includes a data communications network 31 represented by a cloud. That network 31 is, for example, one or more of a local area network (LAN), a metropolitan area network (MAN) or a wide area network (WAN). Such network 31 provides data communications services between various user terminals 45a-d and an application management environment 33, described further below. The network 31 also provides data communications services between at least one user terminal 45c and a project data portal 39, described further below.

In one example, user terminals 45a-d are located in geographically dispersed locations (e.g., user terminal 45a is located on east coast, user terminal 45b is located on west coast, and user terminal 45c located in the Midwest). Although FIG. 1 depicts a single individual associated with each user terminal (e.g., developer 17 with user terminal 45a, test team member 15 with user terminal 45b, etc.), no such requirement exists and any number of each type of individual (e.g., developer 17, test team member 15, application release coordinator 12 and application development manager 19) may utilize any number of user terminals 45a-d in any number of locations. Thus, in one example with multiple groups of developers 17, each group and individuals within a particular group may be located geographically dispersed from the other groups or individuals and network 31 provides data communications services between the various groups as well as application management environment 33. Hence, application management environment 33 provides a centralized location to coordinate and apply code changes submitted via network 31 from various user terminals 45a-d located in various locations.

The application management environment 33 is, for example, an environment in which code changes to one or more software applications can be created, applied and tested before the one or more changed software applications are placed into a production or "live" environment. In general, an environment is the hardware and/or software configuration, or the mode of operation, of a computer system. Similarly, a platform is a specific type of computer hardware and/or computer operating system. Thus, application management environment 33 is one example of a configuration, including hardware and/or software, of a computer system and such configuration may include other environments and/or platforms. Although FIG. 1 depicts application management environment 33 as a single block, there is no such requirement that the application management environment 33 be implemented within a single physical hardware system or that each of the elements be implemented on the same physical hardware system. In one example, application management environment 33 is a mainframe computer system. In a further example, the mainframe computer system includes multiple physical hardware systems configured to provide distributed computing resources. In still a further example, the mainframe computer system is organized as one or more logical partitions. Alternatively, application management environment 33 is, for example, one or more host or server computers configured to provide coordination of code changes via a release template. In yet another alternate example, application management environment 33 is a combination of one or more mainframe computer systems and one or more host or server computers each implementing at least some portion of one or more of the various elements of application management environment 33.

Application management environment 33 includes, for example, test environment 41, change control platform 37, release template 49 and project management platform 35. Test environment 41 is, for example, an environment in which one or more software applications are tested before each application is released or deployed into a production or "live" environment. In one example, test environment 41 is implemented within a mainframe computer system. In a further example, test environment 41 is implemented within a logical partition of the mainframe computer system. Thus, in these examples, test environment 41 includes the necessary hardware and software to run and test the software application to be changed. In general, although an operating system is also a collection of multiple sets of programming code or instructions, any reference to software application in the various examples includes those software applications that run on top of and/or utilize services of an operating system, but does not include any operating system. As such, test environment 41, in the examples, includes an operating system as part of the necessary software to run and test the software application to be changed.

Change control platform 37 is, for example, a platform that receives code changes from a developer 17 via a user terminal 45a and applies the received code changes to test environment 41. In one example, change control platform 37 operates within a mainframe computer system. In a further example, change control platform 37 operates within a logical partition. Change control platform 37 operates, for example, within the same logical partition implementing test environment 41. Alternatively, change control platform 37 operates, for example, within a different logical partition from the logical partition implementing test environment 41. In yet another alternate example, change control platform 37 operates within a host or server computer and applies received code changes to test environment 41 implemented within a mainframe computer system or logical partition. Change control platform 37 applies received code changes to test environment 41, for example, in response to input received from a test team member 15 via a user terminal 45b or some other automated process and conditioned on a set of conditions, as described in greater detail below.

Release template 49 is, for example, a data structure containing one or more records indicating whether a code change is authorized to be applied in test environment 41. A data structure is, for example, an organized form, such as an array list or string, in which connected data items are held in a computer. In one example, release template 49 is a dataset or file stored in a mainframe computer system or a logical partition. Release template 49 is populated, for example, based on input received from an application release coordinator 12 via a user terminal 45c or based on information received from project data portal 39. Project data portal 39 is, for example, a repository of information related to the one or more software applications being tested in test environment 41 and the various code changes to be applied in test environment 41. In one example, the information includes a project identifier. In a further example, the information includes dates and/or times after which individual code changes may be applied. Such dates and/or times, as described in greater detail below, allow the application of each code change to be controlled and/or coordinated with other inter-related code changes so that, even if a developer completes a code change early/ahead of schedule and desires to test the completed code in the test environment, application of the completed code change will only occur in conjunction with the other inter-related code changes. Release template 49 is described in greater detail below in relation to FIG. 2. How release template 49 is utilized to coordinate code changes in test environment 41 is described in greater detail below in relation to FIGS. 3C and 4.

Project management platform 35 is, for example, a platform that manages individual code change projects and maintains a status for each project. In one example, project management platform 35 operates within a mainframe computer system. In a further example, project management platform 35 operates with a logical partition. Project management platform 35, for example, operates within the same logical partition implementing test environment 41. Alternatively, project management platform 35 operates, for example, within a different logical partition from the logical partition implementing test environment 41. In yet another alternate example, project management platform 35 operates within a host or server computer. Project management platform 35 receives, for example, status updates from an application development manager 19 via a user terminal 45d. Application development manager 19, for example, updates a status of a particular code change project in project management platform 35 after application development manager 19 receives a notification from developer 17 that developer 17 submitted the corresponding code change to change control platform 37.

It should be noted that, while project management platform 35 and project data portal 39 each maintain information about projects, the scope and nature of the projects managed by each is different. Each project within project management platform 35 is directed to a particular code change to be applied in test environment 41. As such, each project within project management platform 35 will be referred to as a code change project herein. In contrast, project data portal 39 is directed to managing each of the one or more applications to be changed and tested within test environment 41 as well as any and all corresponding code changes. In other words, a project within project data portal 39 corresponds to a collection of code change projects and includes information relating the various code change projects within the collection to each other (e.g., a corresponding date and/or time for each code change project after which the code change may be applied). As such, the information contained in project data portal 39 will be referred to as release coordination information herein and a set or collection of release coordination information will be referred to as a release coordination project.

Additionally, it should be noted that, while the project data portal 39 may contain release coordination information regarding all code change projects and the project management platform 35 may manage all code change projects, without coordination between the release coordination information in the project data portal 39 and code change projects in the project management platform 35 by the change control platform 37, approved code changes received by the change control platform 37 may be applied in the test environment 41 even though other required code changes have not been applied. Release template 49, as described in greater detail below, facilitates such coordination by the change control platform 37 to ensure approved code changes are only applied in conjunction with other required code changes.

Figure 2:
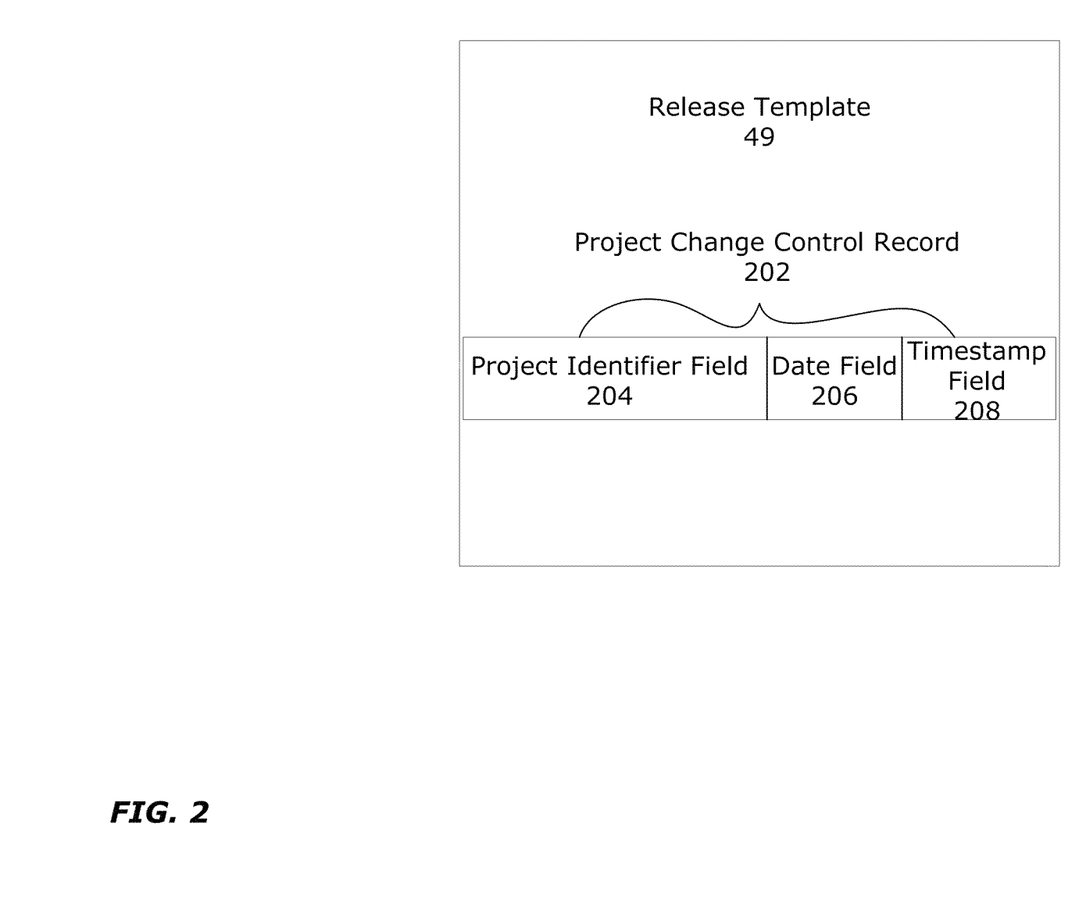
FIG. 2 is a functional block diagram of an example of a project change control record in a release template.

FIG. 2 illustrates an example of a project change control record 202 in release template 49. Each project change control record 202 includes, for example, a project identifier field 204, a date field 206 and a timestamp field 208. In one example, only the project identifier field 204 requires a value. In this example, either or both of the date field 206 and the timestamp field 208 may be omitted or empty. When the date field 206 contains a date, the date represents an appropriate date on or after which the corresponding code change may be applied. When the timestamp field 208 contains a timestamp, the timestamp represents an appropriate time on or after which the corresponding code change may be applied. Each project change control record 202, for example, corresponds to one code change project in project management platform 35. Thus, the project identifier value in the project identifier field 204 is the same as the project identifier of the corresponding code change project in project management platform 35. As described in greater detail below, when at least one project change control record 202 containing the same project identifier value in the project identifier field 204 as the corresponding code change project in the project management platform 35 exists in release template 49 and the corresponding code change project in the project management platform 35 has an approved status, change control platform 37 will apply the corresponding code change in the test environment 41.

Figure 3A:
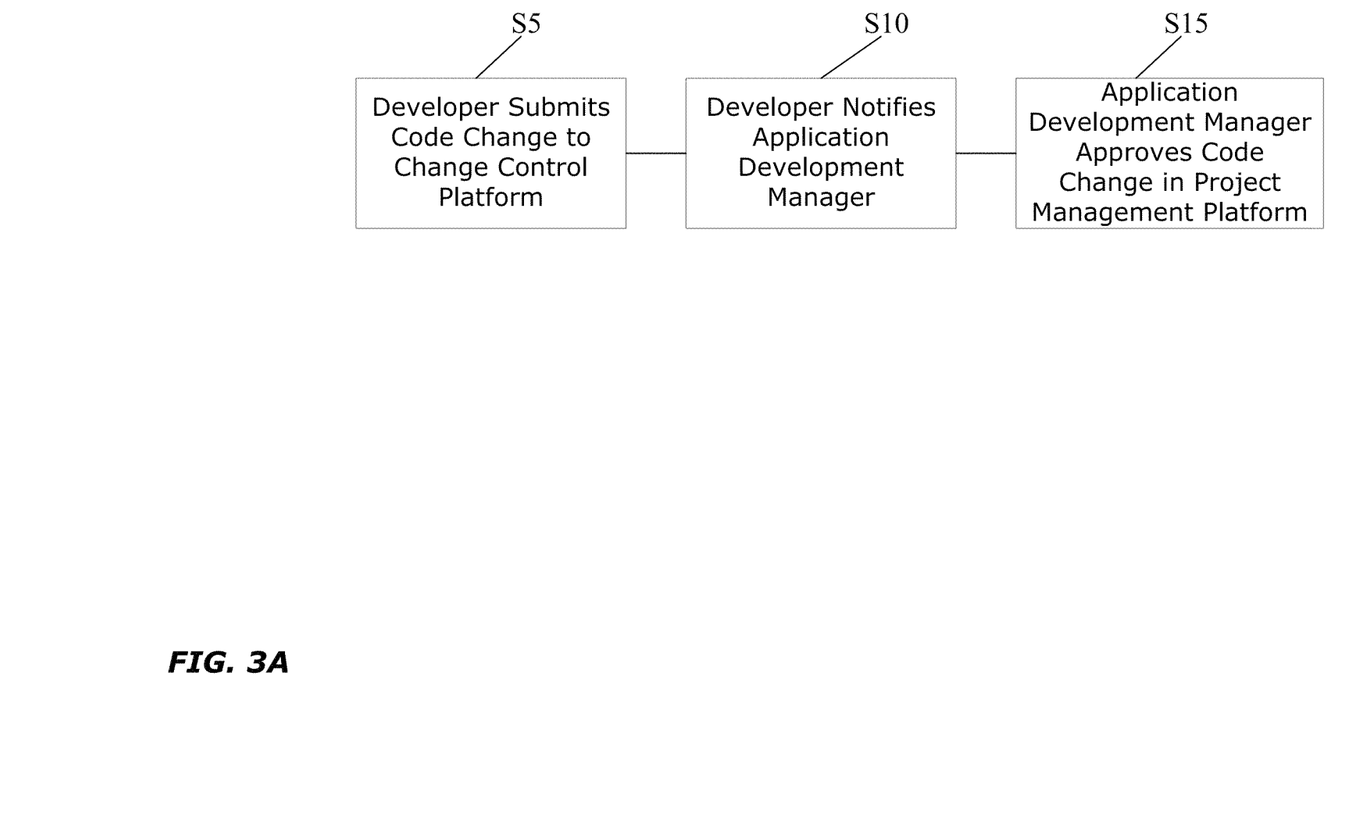
FIG. 3A is a flow chart of an example of a process for submitting code changes to a change control platform.

FIG. 3A illustrates a method for submitting code changes to a change control platform. In step S5, developer 17 submits a code change to change control platform 37. The code change is, for example, a software modification to be applied to one or more applications in the test environment 41. After submitting the code change, developer 17, in step S10, notified application development manager 19 of such code change submission. The notification is, for example, an indication that developer 17 has completed the code change and submitted the completed code change to change control platform 37. The notification further is, for example, an indication that the submitted code change is available to be applied in the test environment 41.

Application development manager 19, in step S15, approves the code change in project management platform 35. In one example, application development manager 19 approves the code change by setting a status of a corresponding code change project to approved in project management platform 35. As noted earlier, each code change project in project management platform 35 manages a status for each respective code change. As such, an approved status for the code change project in project management platform 35 is, for example, an indication only that the corresponding code change is completed and has been submitted to change control platform 37 by developer 17. Such an approved status alone, however, is not, for example, an indication that such corresponding code change is authorized to be applied or that such corresponding code change would be appropriate to be applied.

Figure 3B:
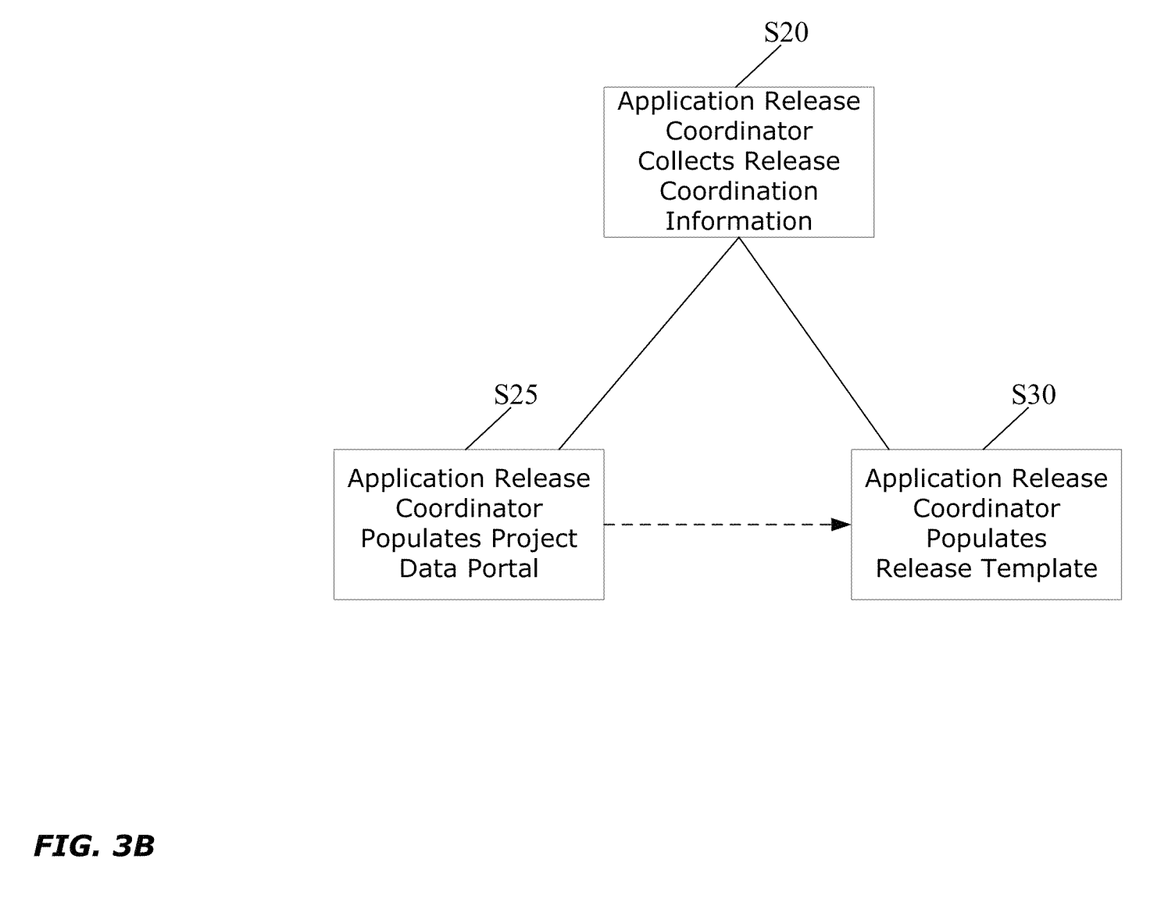
FIG. 3B is a flow chart of an example of a process for populating a project data portal and a release template.

FIG. 3B illustrates a method for populating release coordination information in the project data portal 39 and one or more project change control records 202 in release template 49. In step S20, application release coordinator 12 collects release coordination information, such as release coordination information related to a particular release coordination project. In one example, release coordination information is collected during a meeting (e.g., a turnover meeting). The meeting includes, for example, various participants, such as application release coordinator 12, developer 17, application development manager 19 and test team member 15 as well as similar individuals responsible for other code changes and other individuals responsible for the one or more applications corresponding to the release coordination project and/or test environment 41. The collected release coordination information includes, for example, all code change projects related to the particular release coordination project, one or more applications in the test environment 41 impacted by this release coordination project and dates and/or times corresponding to when one or more individual code changes may be applied.

Application release coordinator 12, in step S25, populates project data portal 39 with the collected release coordination information. In step S30, application release coordinator 12 populates project change control records 202 in release template 49. In one example, application release coordinator 12 populates one project change control record 202 in release template 49 for each code change to be applied in the test environment 41 for one release coordination project. Each respective project change control record 202 contains the corresponding project identifier for the code change from the project management platform 35. That is, in this example, there is one project change control record 202 in release template 49 for each code change project in the project management platform 35 and each pair (i.e. project change control record 202 and code change project) contains a common project identifier. Such existence of a project change control record 202 corresponding to a code change is, for example, an indication only that the corresponding code change is authorized to be applied in the test environment 41. Such authorization, however, is not, for example, an indication that the corresponding code change is complete and has been submitted to change control platform 37 or that the corresponding code change project in project management platform 35 has an approved status.

It should be noted that, in one example, application release coordinator 12 performs each of steps S25 and S30 independently. That is, application release coordinator 12 populates project data portal 39 directly based on input provided by application release coordinator 12 directly to project data portal 39. In addition, application release coordinator 12 populates release template 49 directly based on input provide by application release coordinator 12 directly to release template 49. In an alternate example, application release coordinator 12 populates project data portal 39 directly based on direct application release coordinator 12 input. In turn, application release coordinator 12 populates release template 49 via project data portal 39 (e.g., project data portal 39 provides input to release template 49). In this alternate example, duplicate data input is avoided by application release coordinator 12.

In the previous example, each project change control record 202 only contained a corresponding project identifier value in the project identifier field 204 and presence of the record 202 in release template 49 was an indication of authorization. That is, the mere fact that a code change is part of a release coordination project is sufficient to authorize the code change to be applied in test environment 41. In other examples, however, one code change may be dependent on one or more other code changes to ensure the one or more applications in the test environment 41 continue to function properly. In one further example, release coordinator 12 also populates an identical date within the date field 206 of at least two change control records 202. In this example, the identical date represents an appropriate date on or after which the at least two corresponding code changes may be applied in test environment 41. That is, presence of the at least two change control records 202 in the release template 49 authorizes the at least two corresponding code changes, but only on or after the identical date. In this way, the at least two code changes are coordinated to occur on the same date. In another further example, release coordinator 12 further populates an identical time within the timestamp field 208 of the at least two change control records 202. The identical time, for example, represents an appropriate time on or after which the at least two corresponding code changes may be applied in test environment 41. As such, the at least two corresponding code changes are coordinated to occur at the same time on the same date.

Figure 3C:
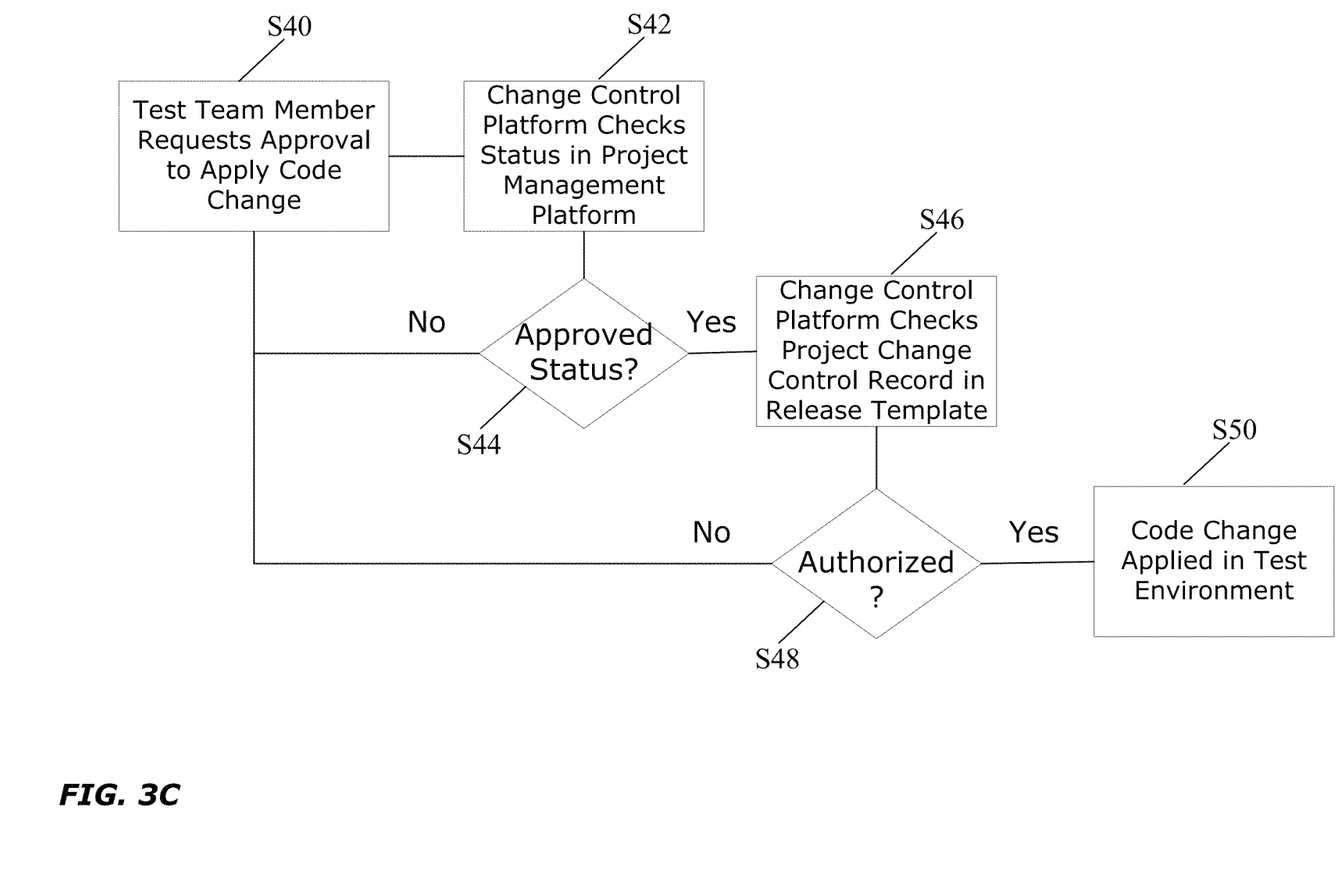
FIG. 3C is a flow chart of an example of a process for applying a code change to a test environment based on a project change control record in a release template.

FIG. 3C illustrates a method for applying a code change to test environment 41 based on a project change control record 202 in release template 49. In step S40, test team member 15 requests approval to apply a code change submitted to change control platform 37. In one example, such approval request is a script or other automated process that performs the remaining steps illustrated in FIG. 3C. In step S42, change control platform 37 checks a status in project management platform 35. In one example, for the code change received by change control platform 37, change control platform 37 checks to determine if the status in the corresponding code change project in project management platform 35 is approved. In step S44, if the corresponding code change project in project management platform 35 is approved, the process continues to step S46. Otherwise, the process returns to step S40 and the test team member 15 is notified that the code change is not approved e.g., step S15 of FIG. 3A has not yet been completed for the code change.

In step S46, change control platform 37 also checks release template 49. For example, change control platform 37 checks release template 49 to determine if a respective project change control record 202 exists in release template 49 for the received code change as an indication the code change is authorized to be applied. As part of step S46, change control platform 37 also determines if any corresponding project change control record 202 contains a date and/or time as well as whether any date and/or time is on or after a current date and/or time as a further indication the code change is authorized to be applied. In step S48, if the code change is authorized, the process continues to step S50. Otherwise, the process returns to step S40 and the test team member 15 is notified that the code change is not authorized to be applied. In one example, the notification is a list of any code changes that have been submitted and approved (e.g., approved in step S44) but do not have a corresponding project change control record 202 in release template 49 and/or for which an allowed date and/or time has not passed.

As described above, step S42 determines whether a code change has been approved in project management platform 35. Similarly, step S46 determines whether a code change is authorized to be applied. If a code change is approved in step S42 and the code change is authorized in step S46, then, in step S50, the code change is approved and applied to test environment 41. In this way, coordination of a code change is performed to ensure the code change is applied in test environment 41 at an appropriate time.

Figure 4:
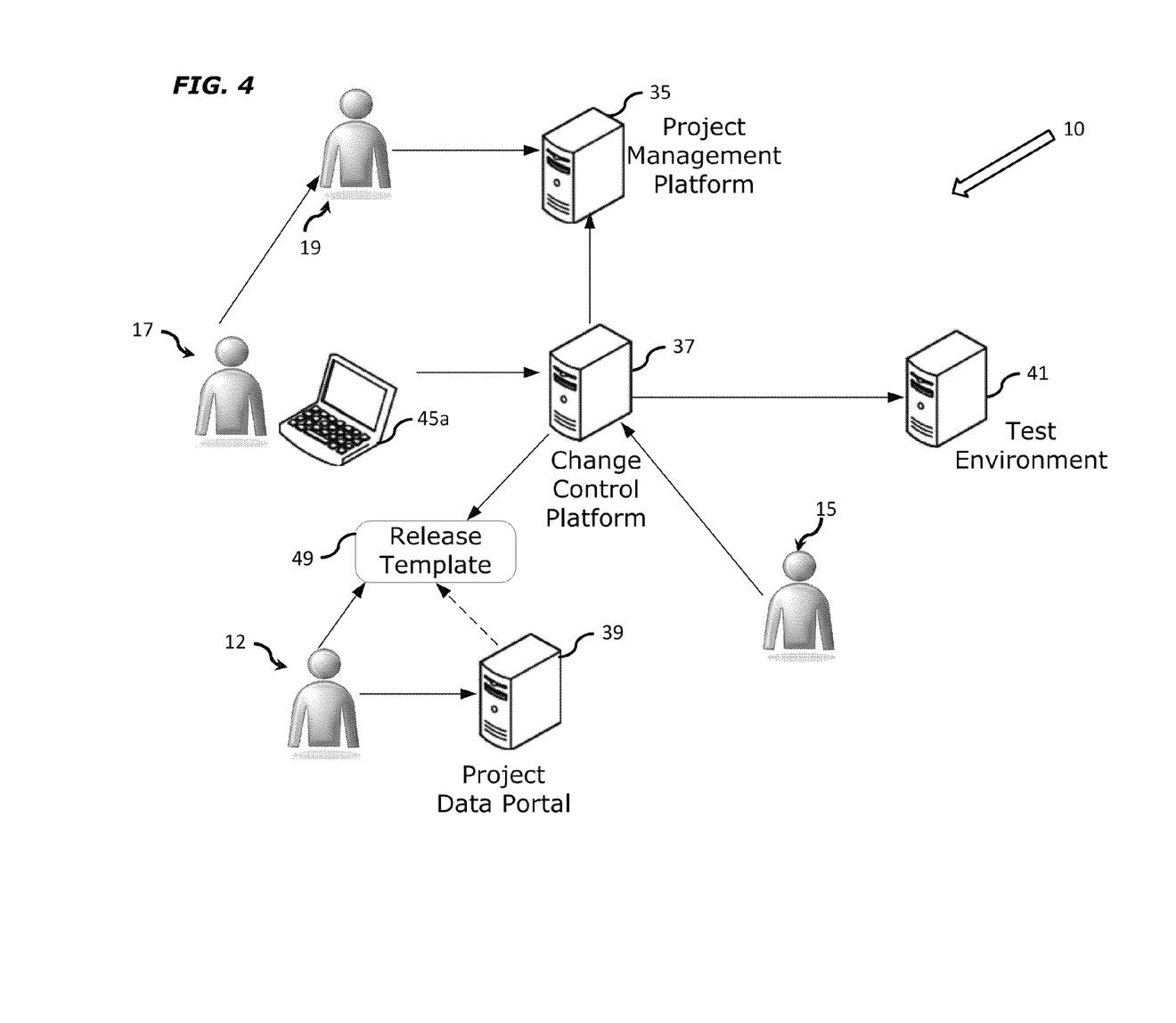
FIG. 4 is a functional block diagram of the example of the system of FIG. 1 depicting various flows between the various elements.

Although FIGS. 3A-3C depict three distinct processes, each of which is performed independently of the others, all three inter-relate in such a way so as to coordinate code changes being applied in test environment 41. FIG. 4 depicts system 10 of FIG. 1 in a different manner as well as the various flows resulting from the processes of FIGS. 3A-3C.

In particular, FIG. 4 depicts release coordinator 12 populating project data portal 39 and release template 49 (e.g., steps S20, S25 and S30 of FIG. 3B), either each directly or, optionally, indirectly. In addition, developer 15 is depicted submitting a code change to change control platform 41 (step S5 of FIG. 3A) and notifying application development manager 19 of the code change submission (step S10). Application development manager 19 is depicted setting a status for the code change to approved in a corresponding code change project of project management platform 35 (step S15). Furthermore, test team member 15 is depicted requesting that the code change be applied in the test environment (step S40 of FIG. 3C). As a result, change control platform 37 is depicted checking release template 49 (step S45) and project management platform 35 (step S50) to determine if the code change is both approved and authorized to be applied. Ultimately, change control platform 37 applies the code change in test environment 41 only if the code change is approved and authorized (step S55). In this way, code changes are coordinated via release template 49.

As shown by the discussion above, aspects of coordinating the release of code changes into a test environment via a release template may be implemented on appropriately configured network connected computers or the like. Although purpose-built hardware could be used, such computers often utilize general purpose hardware configured for particular purposes or functions by appropriate programming. A general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the user applications, and/or client or server applications. The software code is executable by the general-purpose computer that functions as the server and/or that functions as a client on a terminal. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for coordinating the release of code changes via a release template, in essentially the manner performed in the implementations discussed and illustrated herein.

Figures 5, 6:
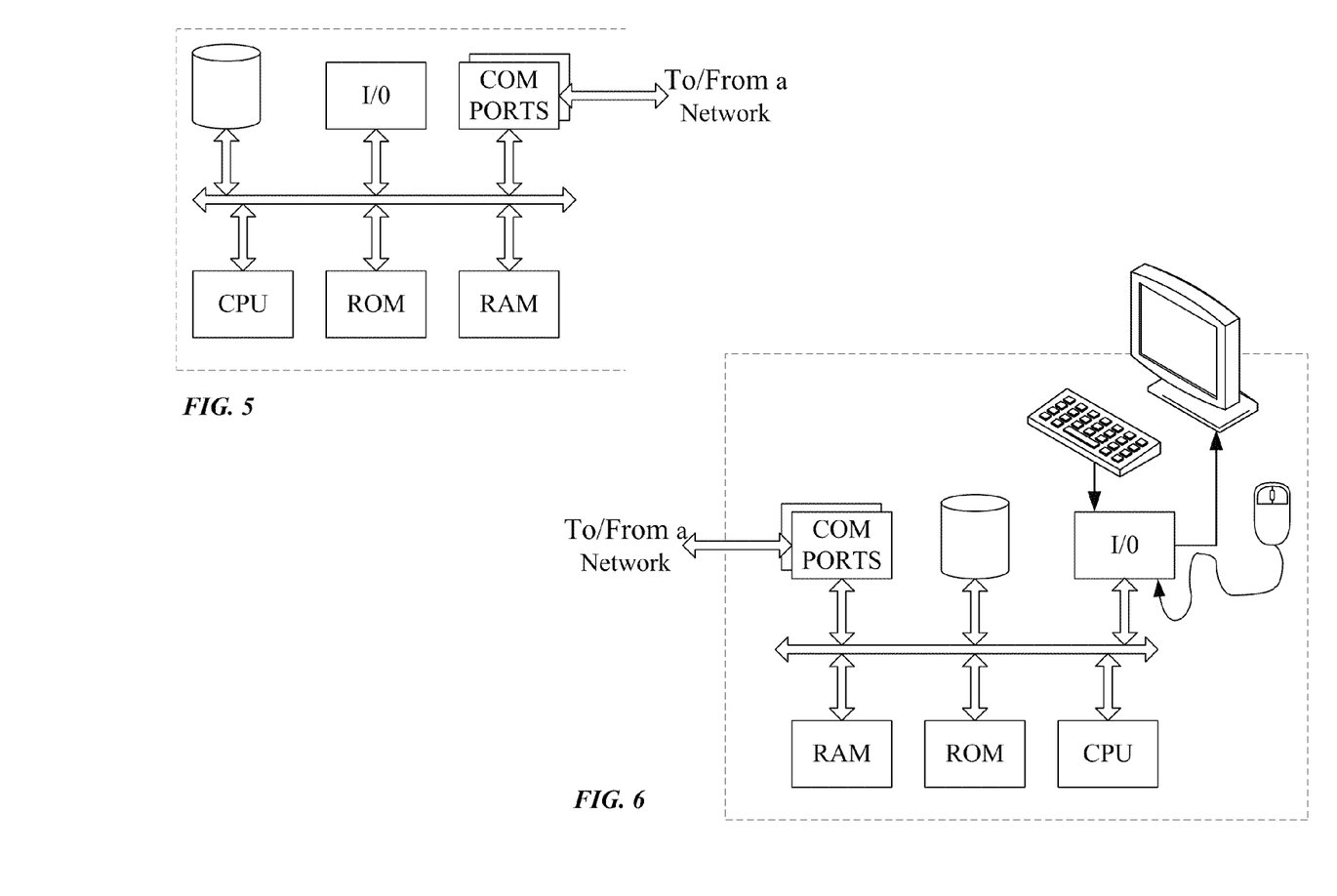
FIG. 5 is a simplified functional block diagram of a computer that may be configured as a host or server, as shown in the system of FIG. 1.
FIG. 6 is a simplified functional block diagram of a personal computer or other work station or terminal device.

FIGS. 5 and 6 provide functional block diagram illustrations of general purpose computer hardware platforms. FIG. 5 illustrates a network or host computer platform, as may typically be used to implement a server and/or mainframe. FIG. 6 depicts a computer with user interface elements, as may be used to implement a personal computer or other type of work station or terminal device, although the computer of FIG. 6 may also act as a server if appropriately programmed. It is believed that the general structure and general operation of such equipment as shown in FIGS. 5 and 6 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 5). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

Hence, aspects of the methods of handling failed messages in a push platform outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the service provider into the computer platform of the application server that will be the push server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the handling of failed messages in a push platform, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a memory to store a data structure that includes project change control records,
      the device receiving the project change control records from a user device associated with an application release coordinator or from a repository related to one or more applications to be tested,
      the project change control records including project identifier values,
      the project change control records being associated with projects,
      each of the projects corresponding to a code change to be applied to the one or more applications; and
   one or more processors to:
      receive, from a user device associated with a developer, a particular code change to be applied to a particular application of the one or more applications,
         the particular code change being associated with a particular project of the projects;
      compare the particular code change and information describing the particular project to the project change control records provided in the data structure;
      determine, based on comparing the particular code change and the information describing the particular project to the project change control records, whether the particular project is assigned an approved status,
         the approved status providing an indication of approval, for the particular project, which is received from an application development manager device,
         the indication of approval being received from the application development manager device after receipt of a notification, from a developer device, indicating that the particular code change has been received by the developer device;
      determine, when the particular project is assigned the approved status, whether at least one project change control record in the data structure contains a particular project identifier value corresponding to the particular code change,
         the data structure containing the particular project identifier value corresponding to the particular code change providing an indication that the particular code change is authorized for release; and
      test, when the particular code change is authorized for release, the particular code change with the particular application prior to deploying the particular application with the particular code change.

2. The device of claim 1, wherein the one or more processors are further to:
   deploy the particular code change with the particular application when the test of the particular code change is complete.

3. The device of claim 1, wherein the one or more processors are further to:
   create each project change control record in the data structure in response to input received from the user device associated with the application release coordinator.

4. The device of claim 1, wherein the one or more processors are further to:
   receive information in response to input received from the user device associated with the application release coordinator; and
   create each project change control record based on the information.

5. The device of claim 1, wherein each project change control record comprises:
   a date field; and
   a set of condition,
      at least one condition, of the set of conditions, indicating that when a particular date field of the at least one project change control record containing the particular project identifier value corresponding to the particular code change contains a date, a determination is to be made as to whether a current date is equivalent to or later than the date contained in the particular date field.

6. The device of claim 5, wherein:
   date fields of at least two project change control records include an identical date such that release of at least two code changes is coordinated to occur on or after the identical date.

7. The device of claim 5, wherein each project change control record comprises:
   a timestamp field; and
   the at least one condition, of the set of conditions, indicates that, when a particular timestamp field of the at least one project change control record containing the particular project identifier value corresponding to the particular code change contains a timestamp, a determination is to be made as to whether a current time is equivalent to or later than the timestamp contained in the particular timestamp field.

8. The device of claim 7, wherein:
   date fields of at least two project change control records include an identical date and timestamp fields of the at least two project change control records include an identical time such that release of at least two code changes is coordinated to occur on or after the identical date and the identical time.

9. A method, comprising:
   receiving, by a device that comprises a processor, project change control records from a user device associated with an application release coordinator or from a repository related to one or more applications to be tested,
      the project change control records including project identifier values,
      the project change control records being associated with projects,
      each of the projects corresponding to a code change to be applied to the one or more applications;
   storing, by the device, the project change control records in a data structure;
   receiving, by the device and from a user device associated with a developer, a particular code change to be applied to a particular application of the one or more applications,
      the particular code change being associated with a particular project of the projects;
   comparing, by the device, the particular code change and information describing the particular project to the project change control records provided in the data structure;
   determining, by the device and based on comparing the particular code change and the information describing the particular project to the project change control records, whether the particular project is assigned an approved status,
    the approved status providing an indication of approval, for the particular project, which is received from an application development manager device,
    the indication of approval being received from the application development manager device after receipt of a notification, from a developer device, indicating that the particular code change has been received by the developer device;
determining, by the device and when the particular project is assigned the approved status, whether at least one project change control record in the data structure contains a particular project identifier value corresponding to the particular code change,
    the data structure containing the particular project identifier value corresponding to the particular code change providing an indication that the particular code change is authorized for release; and
testing, by the device and when the particular code change is authorized for release, the particular code change with the particular application prior to deploying the particular application with the particular code change.

10. The method of claim 9, further comprising:
receiving the information describing the particular project, the information describing the particular project including the particular project identifier value corresponding to particular the code change; and
populating, in the data structure, the at least one project change control record containing the particular project identifier value corresponding to the particular code change based on the information describing the particular project.

11. The method of claim 9, further comprising:
populating, in the data structure, the at least one project change control record containing the particular project identifier value corresponding to the particular code change based on input received from the user device associated with the application release coordinator.

12. The method of claim 9, wherein each project change control record comprises:
a date field; and
a set of one or more conditions,
    at least one condition, of the set of one or more conditions, indicating that when a particular date field of the at least one project change control record containing the particular project identifier value corresponding to the particular code change contains a date, a determination is to be made as to whether a current date is equivalent to or later than the date contained in the particular date field.

13. The method of claim 12, further comprising:
receiving the information describing the particular project, the information describing the particular project including the particular project identifier value corresponding to the particular code change and a date indicating when to apply the particular code change; and
populating, in the data structure, the at least one project change control record containing the particular project identifier value corresponding to the particular code change based on the information describing the particular project.

14. The method of claim 13, further comprising:
populating, in the data structure, at least one additional project change control record containing another particular project identifier value corresponding to another particular code change based on the information describing the particular project.

15. The method of claim 12, further comprising:
populating, in the data structure, the at least one project change control record containing the particular project identifier value corresponding to the particular code change based on input received from the user device associated with the application release coordinator.

16. The method of claim 12, wherein each project change control record comprises:
a timestamp field; and
the at least one condition, of the set of one or more conditions, indicates that, when a particular timestamp field of the at least one project change control record containing the particular project identifier value corresponding to the particular code change contains a timestamp, a determination is to be made as to whether a current time is equivalent to or later than the timestamp contained in the particular timestamp field.

17. The method of claim 16, further comprising:
populating, in the data structure, the at least one project change control record containing the particular project identifier value corresponding to the particular code change, based on received input.

18. A non-transitory computer-readable medium, implemented in hardware and for storing instructions, the instructions comprising:
one or more instructions that, when executed by one or more processors, cause the one or more processors to:
    receive project change control records from a user device associated with an application release coordinator or from a repository related to one or more applications to be tested,
        the project change control records including project identifier values,
        the project change control records being associated with projects,
        each of the projects corresponding to a code change to be applied to the one or more applications;
    store the project change control records in a data structure;
    receive, from a user device associated with a developer, a particular code change to be applied to a particular application of the one or more applications,
        the particular code change being associated with a particular project of the projects;
    compare the particular code change and information describing the particular project to the project change control records provided in the data structure;
    determine, based on comparing the particular code change and the information describing the particular project to the project change control records, whether the particular project is assigned an approved status,
        the approved status providing an indication of approval, for the particular project, which is received from an application development manager device,
        the indication of approval being received from the application development manager device after receipt of a notification, from a developer device, indicating that the particular code change has been received by the developer device;
    determine, when the particular project is assigned the approved status, whether at least one project change control record in the data structure contains a particular project identifier value corresponding to the particular code change, the data structure containing the particular project identifier value corresponding to the particular code change providing an indication that the particular code change is authorized for release; and test, when the particular code change is authorized for release, the particular code change with the particular application prior to deploying the particular application with the particular code change.

19. The non-transitory computer-readable medium of claim 18, further comprising:
one or more instructions that, when executed by the one or more processors, cause the one or more processors to:
deploy the particular code change when the test of the particular code change is complete.

20. The non-transitory computer-readable medium of claim 18, further comprising:
one or more instructions that, when executed by the one or more processors, cause the one or more processors to:
receive information in response to input received from the user device associated with the application release coordinator; and
create each project change control record based on the information.

\* \* \* \* \*